United States Patent [19]
Takanashi et al.

[11] Patent Number: 5,422,663
[45] Date of Patent: Jun. 6, 1995

[54] IMAGE FORMATION AND ERASURE ON AND FROM SCATTERING-MODE LIGHT-MODULATION DEVICE

[75] Inventors: Itsuo Takanashi, Kamakura; Shintaro Nakagaki, Miura; Tsutou Asakura, Yokohama; Yoshihisa Koyama, Yokosuka; Hiroyuki Bonde, Yokohama, all of Japan

[73] Assignee: Victor Company Of Japan, Ltd., Yokohama, Japan

[21] Appl. No.: 220,648

[22] Filed: Mar. 31, 1994

Related U.S. Application Data

[62] Division of Ser. No. 842,032, Feb. 26, 1992, Pat. No. 5,315,318.

[30] Foreign Application Priority Data

Feb. 28, 1991 [JP] Japan .................................. 3-58265
Feb. 28, 1991 [JP] Japan .................................. 3-58266

[51] Int. Cl.⁶ .......................... B41M 5/28; B41J 2/32
[52] U.S. Cl. .......................... 347/179; 359/36; 359/43; 359/44; 359/45; 359/66; 359/67; 359/68; 346/135.1; 347/264
[58] Field of Search ............ 346/76 PH, 76 R, 135.1; 359/36, 43, 44, 45, 66, 67, 68

[56] References Cited

U.S. PATENT DOCUMENTS

| | | | |
|---|---|---|---|
| 4,675,699 | 6/1987 | Kan et al. | 346/76 PH |
| 4,734,359 | 3/1988 | Oguchi et al. | 346/135.1 |
| 4,996,537 | 2/1991 | Kishimi | 346/76 PH |
| 5,065,250 | 11/1991 | Takanashi et al. | 346/135.1 |
| 5,144,415 | 9/1992 | Takanashi et al. | 358/43 |
| 5,315,318 | 5/1994 | Takanashi et al. | 346/76 PH |

FOREIGN PATENT DOCUMENTS 414012 1/1992 Japan .

*Primary Examiner*—Huan H. Tran
*Attorney, Agent, or Firm*—Lowe, Price, LeBlanc & Becker

[57] ABSTRACT

An image formation apparatus using a recording medium including a scattering-mode light-modulation member which takes an opaque state in response to a heat and takes a transparent state in response to an electric field. The apparatus comprises an electrode device disposed in opposed relation to the recording medium and a charge removal device facing or in contact with the recording medium. The electrode device applies an electric field to the recording medium thereby completely erasing an image previously recorded in the recording medium and the charge removal device removes charge left in the recording medium due to application of the electric field by the electrode device. After the erasure, the recording medium is heated by a thermal head in accordance with an information signal from an external device so as to form a new image in the recording medium.

5 Claims, 3 Drawing Sheets

IMAGE FORMATION AND ERASURE ON AND FROM SCATTERING-MODE LIGHT-MODULATION DEVICE

This application is a division of application Ser. No. 07/842,032 filed Feb. 26, 1992, now U.S. Pat. No. 5,315,318.

BACKGROUND OF THE INVENTION

The present invention relates to an image formation apparatus using a scattering-mode light-modulation device as a recording medium and a method of erasing an image formed on the scattering-mode light-modulation device.

Recently, as an information writable and erasable type apparatus there is known an image formation apparatus equipped with, as a recording medium, a scattering-mode light-modulation device comprising a scattering-mode light-modulation plate and an electrode plate which are overlaid with each other on a base plate. The scattering-mode light-modulation device allows the recording and erasure of an electromagnetic-wave information such as an image through heating and application of an electric field, for example. Although such an image formation apparatus can form an extremely fine image, there is a problem, however, in that difficulty is encountered to completely erase the recorded image from the scattering-mode light-modulation device whereby a previous image remains, known as an after-image and the contrast deteriorates due to the effect of the electric charge left irrespective of the erasing electrification.

SUMMARY OF THE INVENTION

It is therefore an object of the present invention to provide an image formation apparatus and image-erasing method which is capable of completely erasing the recorded image so as not to generate the after-image and not to deteriorate the contrast of a newly written image.

In according with the present invention, there is provided an image formation apparatus comprising: a recording medium including a scattering-mode light-modulation member which takes an opaque state in response to a heat and takes a transparent state in response to an electric field; erasure-auxiliary means for heating the recording medium in accordance with a control signal from an external device; erasure means for applying an electric field to the recording medium after the heating due to the erasure-auxiliary means; and image-writing means for heating the recording medium in accordance with an information signal from an external device after the application of the electric field to the recording medium due to the erasure means.

Preferably, the erasure-auxiliary means and the image-writing means is constructed with one thermal head comprising a plurality of heating elements each generating a heat in response to the control signal and the information signal.

Further, according to this invention there is provided an image formation apparatus comprising: a recording medium including a scattering-mode light-modulation member which takes an opaque state in response to a heal and takes a transparent state in response to an electric field; erasure means for applying an electric field to the recording medium; charge-removing means for removing charge left in the recording medium due to the application of the electric field by the erasure means; and image-writing means for heating the recording medium in accordance with an information signal from an external device after the charge-removal from the recording medium by the charge-removing means.

Preferably, the charge-removing means is provided on the image-writing means so as to be brought into contact with the recording medium, and the erasure means and the charge-removing means are constructed with one electrifying means which is arranged to selectively generate different electric fields in polarity with respect to the recording medium.

In addition, according to this invention there is provided a method of forming an image in a recording medium including a scattering-mode light-modulation member which takes an opaque state in response to heat and takes a transparent state in response to electric field, the method comprising the steps of: heating the recording medium; applying an electric field to the recording medium after the heating so as to erase an image previously recorded in the recording medium; and heating the recording medium after the application of the electric field thereto so as to write a new image in the recording medium.

Still further, according to this invention there is provided a method of forming an image in a recording medium including a scattering-mode light-modulation member which takes an opaque state in response to heat and takes a transparent state in response to electric field, the method comprising the steps of: applying an electric field to the recording medium after the heating so as to erase an image previously recorded in the recording medium; coupling an electrode to the recording medium so as to remove charge left in the recording medium through the application of the electric field; and heating the recording medium after the removal of the charge therefrom so as to write a new image in the recording medium.

Moreover, according to this invention there is provided a method of forming an image in a recording medium including a scattering-mode light-modulation member which takes an opaque state in response to heat and takes a transparent state in response to electric field, the method comprising the steps of: applying an electric field to the recording medium after the heating so as to erase an image previously recorded in the recording medium; applying an electric field, different in polarity from the electric field applied for the erasure, with respect to the recording medium so as to remove charge left in the recording medium through the application of the electric field; and heating the recording medium after the removal of the charge therefrom so as to write a new image in the recording medium.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
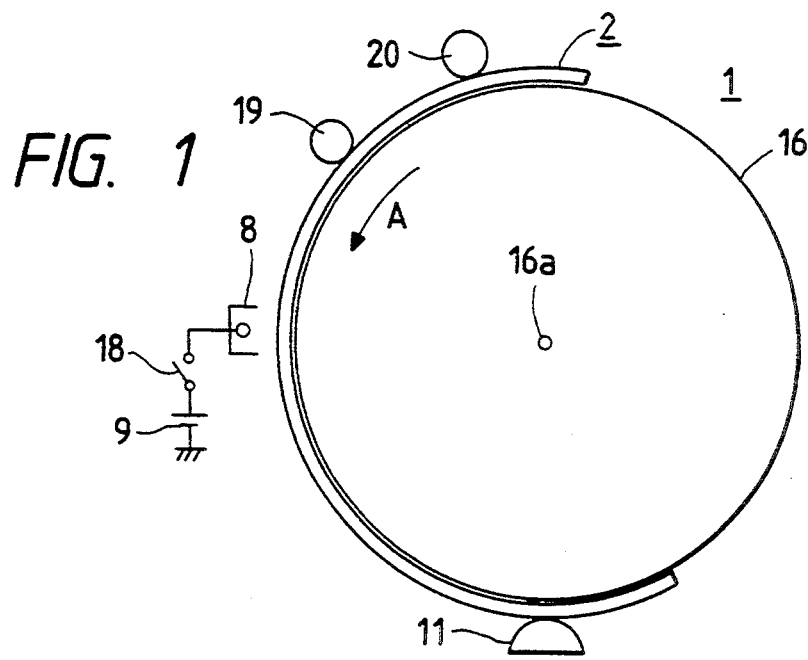
FIG. 1 is a cross-sectional view showing an arrangement of an image formation apparatus according to a first embodiment of the present invention.
Figure 2:
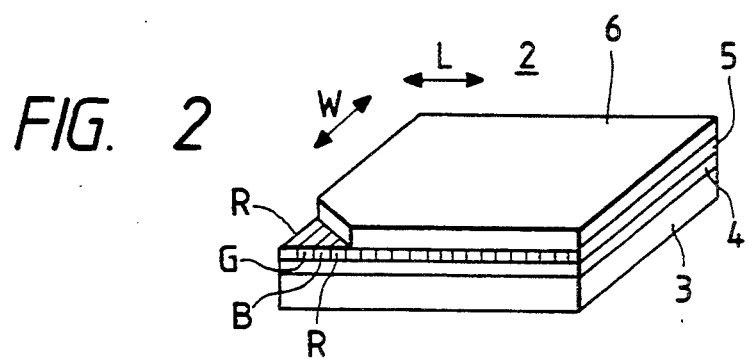
FIG. 2 is a partial broken view showing an arrangement of a recording medium to be used in the image formation apparatus according to this invention.
Figure 3A:
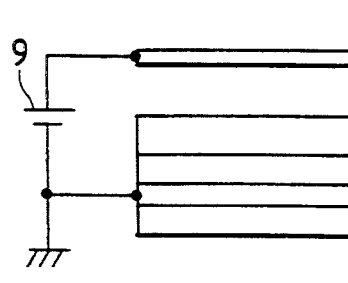
FIGS. 3A and 3B are illustrations for describing the relation between a recording medium and an electrode device in an image-erasure process.

Referring now to FIGS. 1 and 2 there is illustrated an arrangement of an image formation apparatus according to a first embodiment of the present invention. In FIGS. 1 and 2, designated at numeral 16 is a metal drum having a cylindrical configuration and having on its circumferential surface a recording medium 2. The recording medium 2 is integrally constructed with the drum 16 or individually constructed and attached to the surface of the drum 16. The drum 16 is arranged to be rotatable about a shaft 16a in a direction indicated by an arrow A in FIG. 1. The shaft 16a is coupled through a well-known transmission mechanism to a drive motor, not shown, so as to be rotatable in response to the rotational control of the drive motor. Further, designated at numeral 11 is a thermal head which is provided in opposed relation to the recording medium 2 and which is composed of a plurality of heating elements successively arranged in the primary scanning directions (the directions along the shaft 16a of the drum 16). The heating elements are arranged to have a resolution of about 8 dot/mm to 16 dot/mm and to generate heats corresponding to information signals inputted. Also, in opposed relation to the recording medium 2 and at the upstream side of the thermal head 11 there is provided an electric-field erasing device such as an electrode device 8 coupled through a switch 18 to a power source 9. The recording medium 2, as illustrated in FIG. 2, comprises a base 3, an electrode 4, a color-stripe filter 5 and a scattering-mode light-modulation member 6 which respectively have plate-like configurations and which are arranged to be overlaid with each other so as to take an integrally laminated structure in accordance with a well-known technique. More specifically, as illustrated in FIG. 3A, on the base plate 3 made of a transparent PET (polyethylene terephthalate) material there is provided the electrode plate 4 made from a transparent ITO (indium-tin oxide) film. Further, on the electrode plate 4 there is placed the color-stripe filter 5 comprising a plurality of sets of stripes each linearly extending in directions (transverse directions) indicated by arrows W in FIG. 2. Each set of stripes has a plurality of different colors, for example, red (R), green (G) and blue (B), corresponding to color-signal components of an electromagentic-wave information signal to be supplied to the thermal head 11. The R, G and B filter stripes are successively and repeatedly arranged in order in directions (longitudinal directions) indicated by arrows L which is coincident with the primary scanning directions. Further, each of the R, G and B filter stripes has a width substantially equal to the dimension of each of the heating elements of the thermal head 11. In addition, on the color-stripe filter 5 there is provided the scattering-mode light-modulation member 6 constructed with a material including a liquid crystal film such as a polymer dispersed liquid crystal film and a ferroelectric liquid crystal film or constructed with a ceramics such as PLZT. The scattering-mode light-modulation member 6 has an optical characteristic to scatter light when heated and keep the light-scattering state even after being cooled, and further has an optical characteristic to take a transparent state in response to application of an electric field thereto and keep the transparent state by removal of the electric field. That is, the scattering-mode light-modulation member 6 can take two states (an opaque state and a transparent state) in accordance with heat and electric field.

For example, in the case of using the polymer dispersed liquid crystal film for the scattering-mode light-modulation member 6, the polymer-liquid crystal film 6 is made of any one of methacrylic resin, polyester resin, polycarbonate resin, vinyl chloride resin, polyamide resin, polyethylene resin, polypropylene resin, polystyrene resin, silicon resin and others, and constructed as a porous polmeric film randomly having a number of microscopic holes so as to have a volume resistivity of above $10^{14}$ $\Omega$cm, the number of microscopic holes whose diameters are below 0.5 microns (for example) being filled with a nematic liquid crystal. It is also appropriate that the polmer-liquid crystal film 6 is constructed with a smectic liquid crystal being randomly mixed with acrylate resin.

Figure 3B:
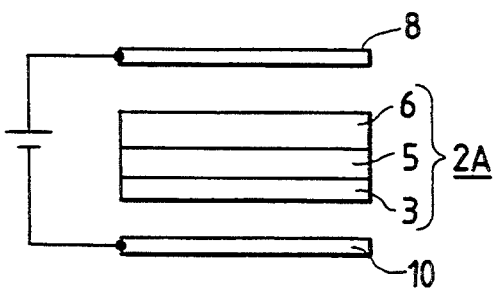

Here, the laminating order is not limited to that shown in FIG. 2. For instance, it is appropriate that the scattering-mode light-modulation member 6 is directly placed on the electrode plate 4 and the color-stripe filter 5 is piled up on the scattering-mode light-modulation member 6. Moreover, it is also appropriate that as illustrated in FIG. 3B the electrode plate 4 is not provided integrally with the other plates 3, 5 and 6 but an electrode plate 10 is individually disposed in opposed relation to a recording medium 2A comprising the plates 3, 5 and 6 as illustrated in FIG. 3B. In this case, it is possible to use the drum 16 as the electrode plate 10.

Secondly, a description will be made hereinbelow in terms of the basic operation principle of the erasure, recording and reproduction of an image in the recording medium 2. As shown in FIG. 3A, the electrode device 8 coupled to one terminal of the power source 9 is disposed in opposed relation to the scattering-mode light-modulation member 6 of the recording medium 2, the other terminal of the power source 9 being coupled to the electrode plate 4 interposed between the base plate 3 and the color-stripe filter 5, so that an electric field can be applied to the recording medium 2. It is also appropriate that the recording medium 2A is provided between the electrode plate 10 and the electrode device 8 as illustrated in FIG. 3B. When applying an electric field to the recording medium 2 (2A), the scattering-mode light-modulation member 6 constructed with a polymer dispersed liquid crystal film takes a transparent state because the liquid crystal is oriented in the direction of the electric field. The erasing operation of the image formed is effected in accordance with the principle that the scattering-mode light-modulation member 6 enters into the transparent state. Here, it is also appropriate that in place of the electrode device 8 a corona electrifier is provided to face the scattering-mode light-modulation member 6 so that the corona electrifier scans and charges the recording medium 2.

Figure 4A:
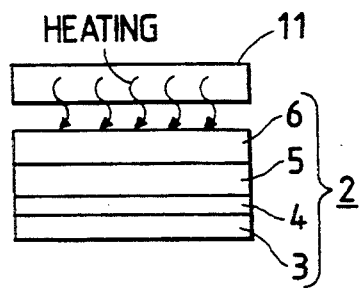
FIG. 4A is an illustration for describing the relation between a thermal head and a recording medium in an image-writing process.

In addition, as shown in FIG. 4A, the thermal head 11 acting as a heating device is disposed to face the scattering-mode light-modulation member 6 so as to heat the recording medium 2. In response to the heating due to the thermal head 11, the scattering-mode light-modulation member 6 takes an opaque state because the liquid crystal first enters into an isotropic-phase state when heated and then becomes an irregularly arranged state when cooled. This principle that the scattering-mode light-modulation member 6 takes the opaque state is used for recording operation and easure-auxiliary operation (full-writing operation) which will be described hereinafter.

Figure 4B:
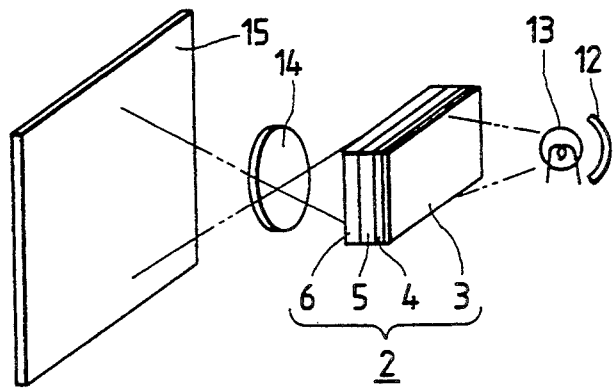
FIG. 4B is a perspective view showing an arrangement of a reproducing system for reproducing an image recorded in a recording medium.

FIG. 4B shows a system for reproducing the image recorded in the recording medium 2 through the heating. In FIG. 4B, a light beam emitted from a light source 13 is incident through a reflection plate 12 on the recording medium 2 from the base plate 3 side. A light beam passing through the recording medium is incident on a lens 14 so as to be diverged and projected onto a screen 15. That is, this system is arranged as a transmission type projector. In the case that the base plate 3 is made of an opaque material, the system is constructed as a reflection type projector.

Figure 5A:
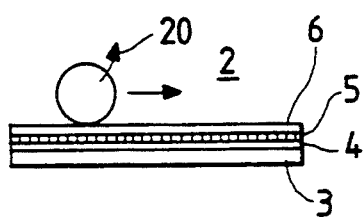
FIGS. 5A to 5C are illustrations for describing the erasure-auxiliary process, erasure process and image-writing process to be effected by the image formation apparatus according to the first embodiment of this invention.
Figure 5B:
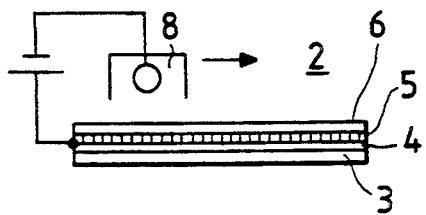
Figure 5C:
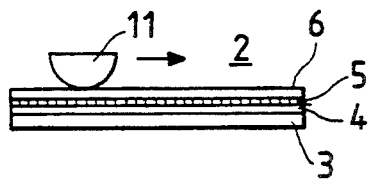

A description will hereinbelow be made in detail with reference to FIGS. 5A to 5C in terms of an image erasure of the image formation apparatus according to this embodiment, FIG. 5A showing an erasure-auxiliary process to be effected prior to the erasure and FIG. 5B showing an erasure process to be effected after the erasure-auxiliary process. In FIG. 5A, the recording medium 2 is first heated from the scattering-mode light-modulation member 6 side by means of a heater 20 which is positioned at an upstream side with respect to the electrode device 8 in the drum 16 rotating direction A and disposed to face the scattering-mode light-modulation member 6 of the recording medium 2. This heating due to the heater 20 causes the recording medium 2 to uniformly take an opaque state (i.e., full-written state). After the erasure-auxiliary process, an electric field is applied to the recording medium 2 through the electrode device which acts as the electric-field erasing device, as illustrated in FIG. 5B. This application of the electric field to the recording medium 2 allows the recording medium 2 to take a transparent state because the liquid crystal of the scattering-mode light-modulation member 6 is oriented in the electric-field direction. In other words, the image previously recorded can be erased from the recording medium 2. In the control operation for the easure-auxiliary process and the erasure process, when the drum 16 is rotating in the direction A, the heater 20 is turned ON to start the heating and then the switch 18 is closed to generate the electric field with respect to the recording medium 2. Here, although in the above-described embodiment the heater 20 and the thermal head 11 are individually provided, it is appropriate to arrange the thermal head 11 so as to act as both the erasure-auxiliary means and writing means.

According to this arrangement, since the the electrode device applies an electric field to the recording medium 2 to previously make clear the scattering-mode light-modulation member 6 after the heater heats the recording medium 2 so that the recording medium 2 becomes a uniformly opaque state, the image previously recorded can be erased completely. After the erasure, the thermal head 11 positioned at the downstream side with respect to the electrode device 8 newly writes an image in the recording medium as illustrated in FIG. 5C. In FIG. 1, numeral 19 designates a cooling device for removing the heat applied in the erasure-auxiliary process. The cooling device 19 can be provided if required.

Figure 6A:
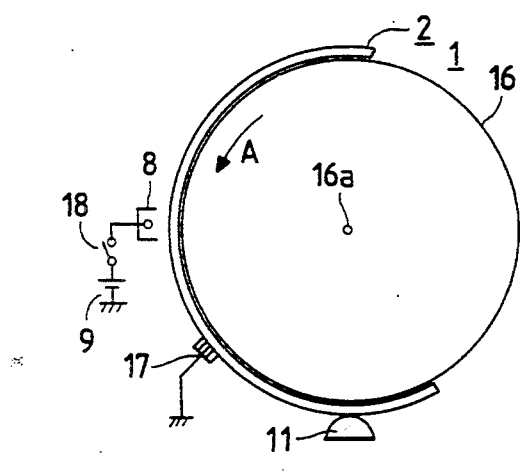
FIGS. 6A to 6D show examples of a charge-removing device to be used in a second embodiment of the present invention.
Figure 6B:
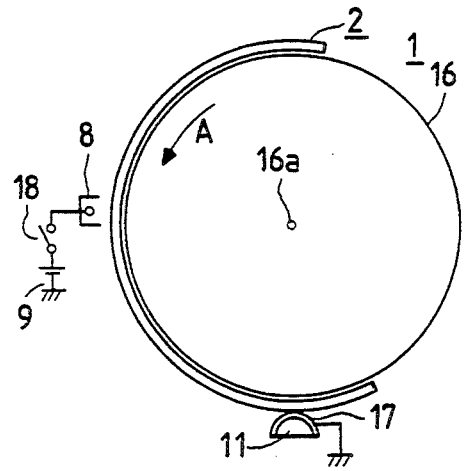
Figure 6C:
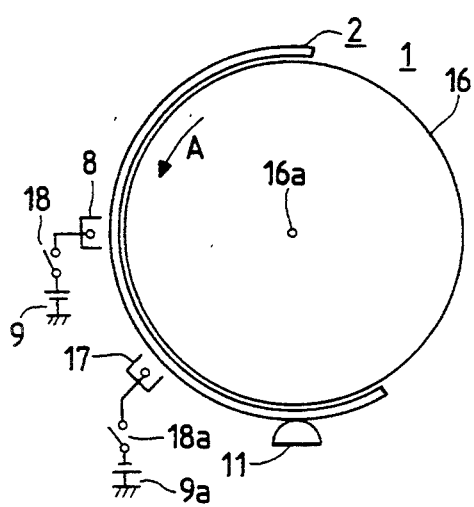
Figure 6D:
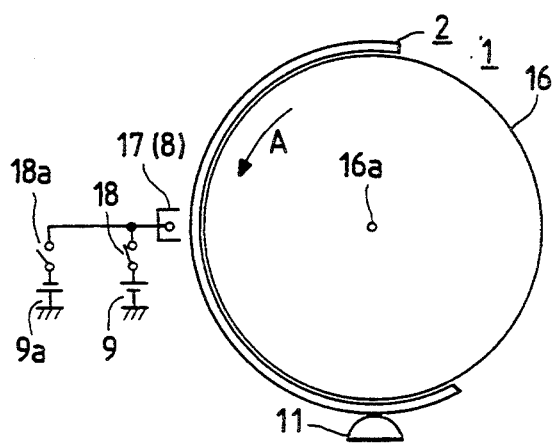

Further, a description will be made hereinbelow with reference to FIGS. 6A to 6D and 7A to 7C in terms of a second embodiment of the present invention. An image formation apparatus according to the second embodiment is, in place of the heater 20, equipped with a charge-removing device. This charge-removing device is for removing the charge given in the erasure process due to the electrode device 8 from the recording medium 2, i.e., for eliminating the charged state of the recording medium 2, and is disposed to face the scattering-mode light-modulation member 6 of the recording medium 2 or come into contact therewith. This charge-removing device can take various structures as illustrated at numeral 17 in FIGS. 6A to 6C. That is, the charge-removing device 17 illustrated in FIG. 6A is of a brush type that one end is grounded, the charge-removing device 17 illustrated in FIG. 6B is arranged such that an electrode is grounded and provided between the recording medium 2 and the thermal head 11 so as to contact with them, the charge-removing device 17 shown in FIG. 6C is constructed with an electrode coupled through a switch 18a to one terminal of a power source 9a which is reverse in polarity to the terminal of the power source 18 to which the electrode device 8 is coupled, and the charge-removing device 17 shown in FIG. 6D is constructed with a switch 18a and a power source 9a being additionally provided and the electrode device 8 being coupled through the switch 18a to the power source 9a. In FIG. 6D, the terminal of the power source 9a coupled to the switch 18a is reversed in polarity with respect to the terminal of the power source 9 to which the switch 18 is coupled. In this case, the image erasure and the charge-removal will be performed in different processes (different revolutions of the drum 16). Moreover, in the cases illustrated in FIGS. 6C and 6D, the charge-removing voltage (electric field) to be applied thereto is determined in accordance with the characteristic of the recording medium 2, thereby surely removing the charge from the recording medium 2.

Figure 7A:
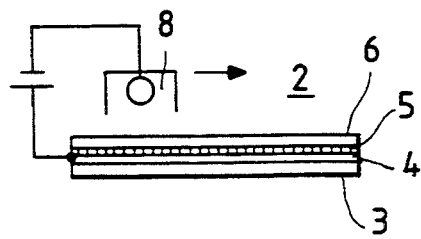
FIGS. 7A to 7C are illustrations for describing the erasure process, charge-removing process and image-writing process to be performed in the second embodiment of this invention.
Figure 7B:
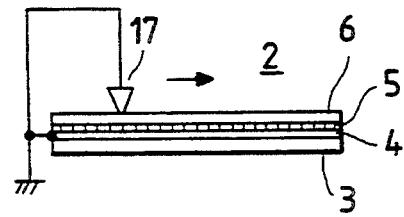
Figure 7C:
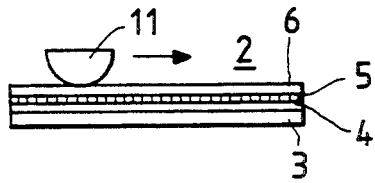

FIGS. 7A to 7C show the erasing, charge-removing and image-writing processes. That is, the electrode device 8 first applies an electric field to the recording medium 2 as illustrated in FIG. 7A so as to make clear the recording medium 2, the charge-removing device 17 then removes the charge due to the erasing process from the recording medium 2, and the thermal head 11 finally writes an image in the recording medium 2 in accordance with the information signal inputted. This arrangement allows improving the contrast without affection of the remaining charge.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An image formation apparatus comprising:

a recording medium including a scattering-mode light-modulation member which takes an opaque state in response to a heat and takes a transparent state in response to an electric field;

erasure means for applying an electric field to said recording medium;

charge-removing means for removing charge left in said recording medium due to application of said electric field by said erasure means; and image-writing means for heating said recording medium in accordance with an information signal from an external device after charge-removal from said recording medium by said charge-removing means.

2. An image formation apparatus as claimed in claim 1, wherein said charge-removing means is provided on said image-writing means so as to be brought into contact with said recording medium.

3. An image formation apparatus as claimed in claim 2, wherein said erasure means and said charge-removing means are constructed with one electrifying means which is arranged to selectively generate different electric fields in polarity with respect to said recording medium.

4. A method of forming an image in a recording medium including a scattering-mode light-modulation member which takes an opaque state in response to heat and takes a transparent state in response to electric field, said method comprising the steps of:

applying an electric field to said recording medium after heating so as to erase an image previously recorded in said recording medium;

coupling an electrode to said recording medium so as to remove charge left in said recording medium through the application of said electric field; and heating said recording medium after removal of the charge therefrom so as to write a new image in said recording medium.

5. A method of forming an image in a recording medium including a scattering-mode light-modulation member which takes an opaque state in response to heat and takes a transparent state in response to electric field, said method comprising the steps of:

applying an electric field to said recording medium after heating so as to erase an image previously recorded in said recording medium;

applying an electric field, different in polarity from said electric field applied for the erasure, with respect to said recording medium so as to remove charge left in said recording medium through the application of said electric field; and heating said recording medium after removal of the charge therefrom so as to write a new image in said recording medium.

* * * * *